US011015715B2

(12) United States Patent
Miller et al.

(10) Patent No.: US 11,015,715 B2
(45) Date of Patent: May 25, 2021

(54) RAMPED SPACER RING SEAL (71) Applicant: United Technologies Corporation, Farmington, CT (US)

(72) Inventors: Jonathan Logan Miller, Ware, MA (US); Aneil S. Hegde, Vernon, CT (US); Michael M. Davis, North Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 82 days.

(21) Appl. No.: 15/928,207

(22) Filed: Mar. 22, 2018

(65) Prior Publication Data
US 2019/0293183 A1 Sep. 26, 2019

(51) Int. Cl.
F16J 15/34 (2006.01)
F01D 11/00 (2006.01)
F16J 15/44 (2006.01)
F16J 15/26 (2006.01)
(Continued)

(52) U.S. Cl.
CPC ........... *F16J 15/3472* (2013.01); *F01D 11/00* (2013.01); *F16J 15/26* (2013.01); *F16J 15/441* (2013.01); *F01D 11/003* (2013.01); *F01D 25/16* (2013.01); *F01D 25/183* (2013.01);
(Continued)

(58) Field of Classification Search
CPC ........ F16J 15/3472; F16J 15/26; F16J 15/441; F01D 11/00; F01D 11/003; F01D 25/16; F01D 25/183; F05D 2220/323; F05D 2240/55; F05D 2240/581
See application file for complete search history.

(56) References Cited

U.S. PATENT DOCUMENTS 4,211,424 A * 7/1980 Stein ..................... F01D 11/003
                                                      277/352
5,020,809 A   6/1991 Mullaney
6,322,079 B1 11/2001 Mullaney, III
(Continued)

FOREIGN PATENT DOCUMENTS

EP   1022436 A2   7/2000
EP   2420649 A2   2/2012
(Continued)

OTHER PUBLICATIONS

European Search Report Issued in EP Application No. 19164445.9, dated Jul. 5, 2019, 11 Pages.

*Primary Examiner* — David P Bryant
*Assistant Examiner* — Nirvana Deonauth
(74) *Attorney, Agent, or Firm* — Cantor Colburn LLP (57) ABSTRACT

A ring seal assembly includes a first seal seat, a second seal seat axially abutting the first seal seat and two or more seal rings located axially between the first seal seat and the second seal seat. One or more pilot features are positioned at one or more of the first seal seat or the second seal seat to radially locate a ring seal of the two or more seal rings during assembly of the ring seal assembly. A method of installing a ring seal assembly includes securing a first seal seat at a rotating component, inserting a first seal ring onto the first seal seat, and installing a second seal ring and a second seal seat to the rotating component. The second seal ring is guided into a selected radial position via one or more pilot features located at the first seal seat and/or the second seal seat.

18 Claims, 8 Drawing Sheets

(51) Int. Cl.
*F01D 25/16* (2006.01)
*F01D 25/18* (2006.01)

(52) U.S. Cl.
CPC .... *F05D 2220/323* (2013.01); *F05D 2240/55* (2013.01); *F05D 2240/581* (2013.01)

(56) References Cited

U.S. PATENT DOCUMENTS

| | | |
|---|---|---|
| 8,777,229 B2 | 7/2014 | Davis |
| 9,410,556 B2 | 8/2016 | Miller et al. |
| 10,145,255 B2* | 12/2018 | Miller .................... F16J 15/441 |
| 2006/0002803 A1* | 1/2006 | Aguilar ................ F16J 15/3272 |
| | | 417/407 |
| 2008/0260521 A1* | 10/2008 | Werro ................... F01D 25/183 |
| | | 415/170.1 |
| 2016/0273375 A1 | 9/2016 | Miller |

FOREIGN PATENT DOCUMENTS

| | | |
|---|---|---|
| EP | 3048343 A1 | 7/2016 |
| EP | 3354945 A1 | 8/2018 |

\* cited by examiner

RAMPED SPACER RING SEAL

BACKGROUND

Exemplary embodiments pertain to the art of gas turbine engines. More particularly, the present disclosure relates to ring seal assemblies for gas turbine engines.

Ring seal assemblies are utilized in selected locations in gas turbine engines to seal, for example, bearing compartments between rotating components and stationary components of the gas turbine engine. The ring seal assembly typically includes ring seals formed from, for example, graphite carbon, located and supported by seal spacers. During ring seal assembly, the ring seals are installed to a first seal spacer. When a ring seal is eccentric or installed off-center to the first seal spacer, the ring seal is subsequently damaged upon installation of a second seal spacer, because of an undesired impact between the ring seal and an edge or face of the first seal spacer. Such damage shortens a useful service life of the ring seal and reduces the effectivity of the seal

BRIEF DESCRIPTION

In one embodiment, a ring seal assembly includes a first seal seat, a second seal seat axially abutting the first seal seat and two or more seal rings located axially between the first seal seat and the second seal seat. One or more pilot features are positioned at one or more of the first seal seat or the second seal seat to radially locate a ring seal of the two or more seal rings during assembly of the ring seal assembly.

Additionally or alternatively, in this or other embodiments the first seal seat includes a first pilot extending from the first seal seat. A first seal ring of the two or more seal rings is located radially outboard of the first pilot.

Additionally or alternatively, in this or other embodiments the first pilot extends from a radially-extending first seat flange.

Additionally or alternatively, in this or other embodiments the first pilot tapers in radial width with an increasing distance from the first seat flange.

Additionally or alternatively, in this or other embodiments the first pilot is configured to guide a second seal ring to a radial position outboard of the first pilot upon installation of the second seal ring and the second seal seat.

Additionally or alternatively, in this or other embodiments the second seat includes a second pilot extending from the second seal seat. A second seal ring of the two or more seal rings is located radially outboard of the second pilot.

Additionally or alternatively, in this or other embodiments the second pilot extends from a radially-extending second seat flange.

Additionally or alternatively, in this or other embodiments the second pilot is configured to guide the second seal ring to a radial position outboard of the second pilot upon installation of the second seal ring and the second seal seat.

Additionally or alternatively, in this or other embodiments a biasing member is located between a first seal ring and a second seal ring or the two or more seal rings to axially located the first seal ring and the second seal ring in the ring seal assembly.

Additionally or alternatively, in this or other embodiments the biasing member is configured to bias axial positions of the first seal ring and the second seal ring.

Additionally or alternatively, in this or other embodiments the ring seal assembly is configured for installation to a rotating component of a gas turbine engine. The two or more seal rings are configured to interface a rotationally static component of the gas turbine engine.

In another embodiment, a method of installing a ring seal assembly includes securing a first seal seat at a rotating component, inserting a first seal ring onto the first seal seat, and installing a second seal ring and a second seal seat to the rotating component. The second seal ring is guided into a selected radial position via one or more pilot features located at the first seal seat and/or the second seal seat. The first seal ring and the second seal ring are configured to interface with a rotationally static component.

Additionally or alternatively, in this or other embodiments the first seal ring is radially located radially outboard of a first pilot extending from the first seal seat.

Additionally or alternatively, in this or other embodiments the second seal ring is guided into the selected radial position via the first pilot.

Additionally or alternatively, in this or other embodiments the first pilot is radially tapered with increasing axial length of the first pilot.

Additionally or alternatively, in this or other embodiments the second seal ring is guided into the selected radial position via a second pilot extending from the second seal seat.

Additionally or alternatively, in this or other embodiments the second seal ring is installed to the second seal seat, the second seal ring located radially outboard of the second pilot.

Additionally or alternatively, in this or other embodiments an axial position of the first seal ring is biased toward a radially extending first seat flange of the first seal seat, and an axial position of the second seal ring is biased toward a radially extending second seat flange of the second seal seat.

Additionally or alternatively, in this or other embodiments positioning a biasing member axially between the first seal ring and the second seal ring to bias the axial positions of the first seal ring and the second seal ring.

Additionally or alternatively, in this or other embodiments the rotating component is a shaft of a gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
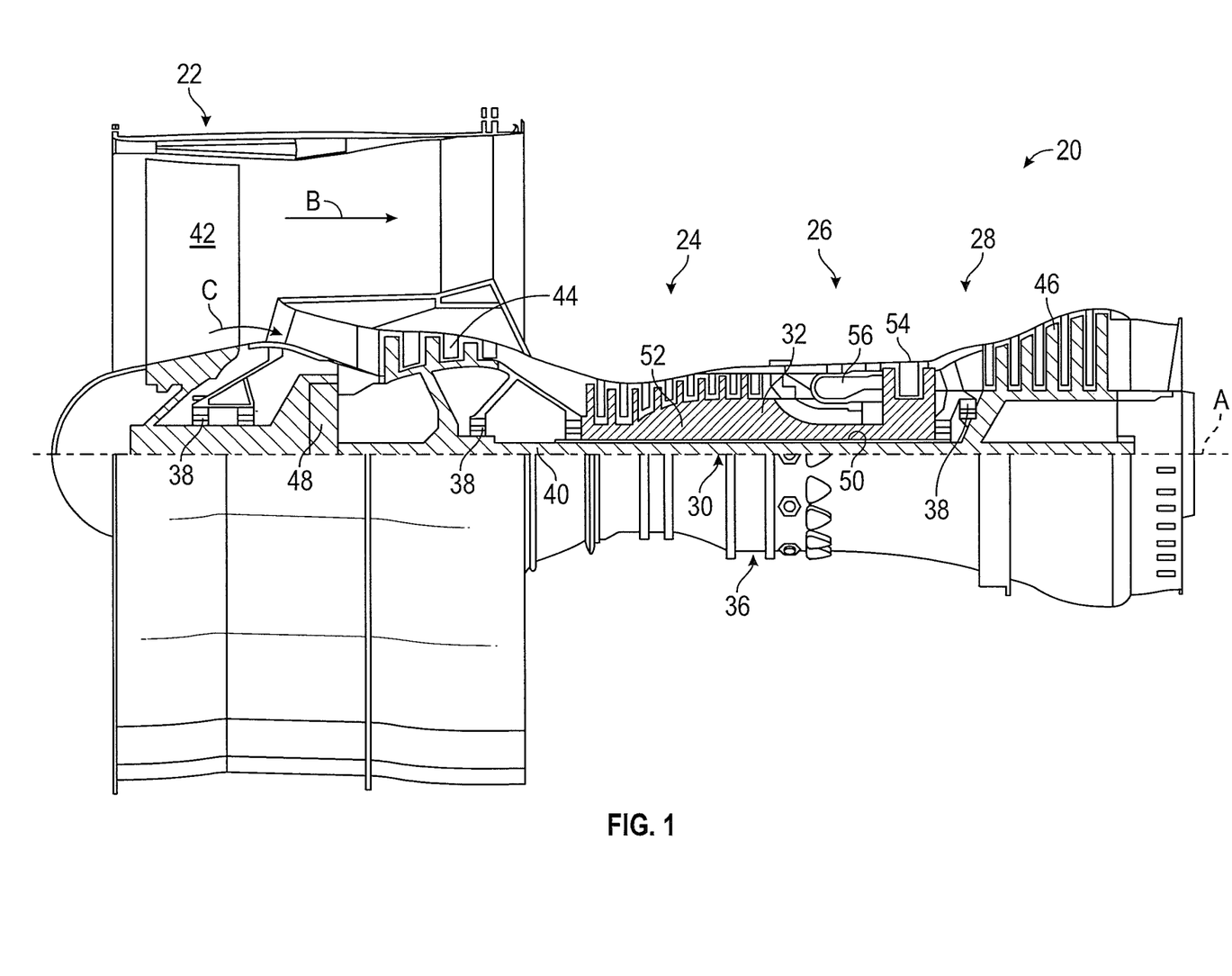
FIG. 1 is an illustration of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
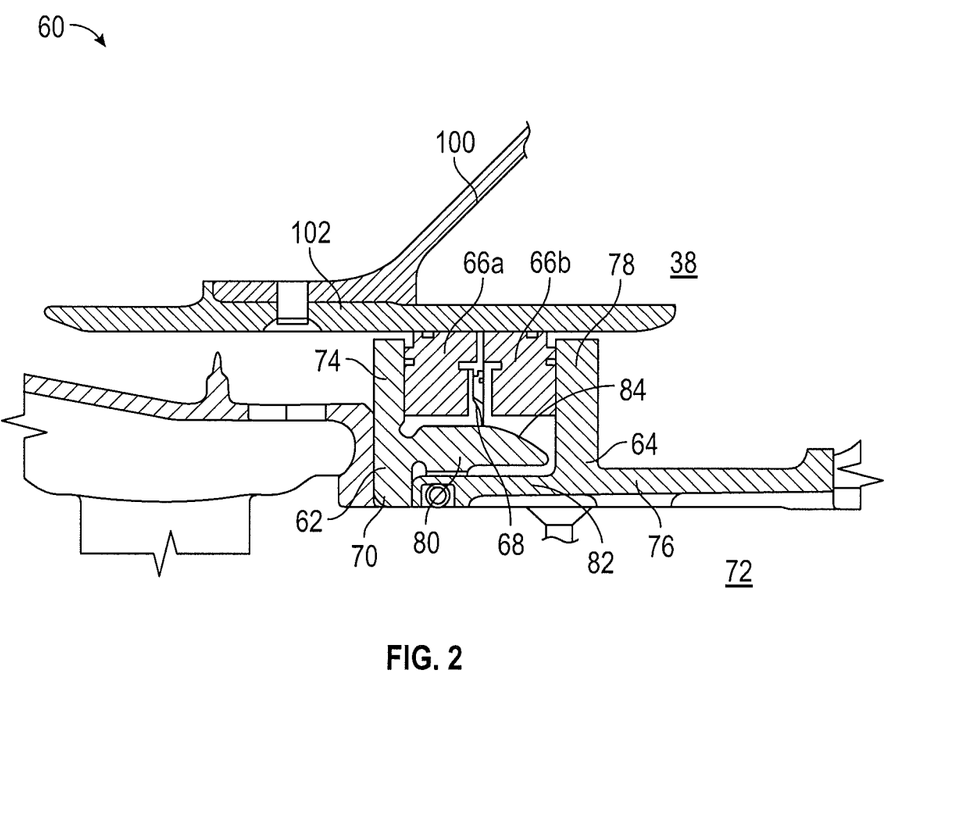
FIG. 2 is an illustration of an embodiment of a ring seal assembly of a gas turbine engine.

Referring to FIG. 2, shown is a perspective view of an embodiment of a rotating ring seal assembly 60, located at, for example, one or more of the bearing systems 38 of the gas turbine engine 20 to provide sealing at the bearing system 38. The ring seal assembly 60 includes a rotating first seal seat 62, a rotating second seal seat 64 and one or more seal rings 66 located axially between the first seal seat 62 and the second seal seat 64. Further, a biasing member, for example, a wave spring 68 is utilized to axially bias positions of the seal rings 66. In the embodiment of FIG. 2, two seal rings 66 are shown, with the wave spring 68 located between the seal rings 66 to press or urge each of the seal rings 66 against the first seal seat 62 or the second seal seat 64. While the use of wave spring 68 as the biasing member is described herein, in other embodiments other biasing members may be utilized, for example, curved washers such as Belleville, slotted, finger, dished, or the like, or helical compression springs or coil springs.

The first seal seat 62 has a first seat base 70 located at and rotatable with a rotating component of the gas turbine engine 20, for example, a shaft 72, while the seal rings 66 radially interface with rotationally stationary static structure 100 of the gas turbine engine 20. The static structure 100 includes a seal runner 102 to which the seal rings 66 interface to seal the bearing system 38. A first seat flange 74 extends radially outwardly from the first seat base 70 defining an axial stop against which a first seal ring 66a is biased by the wave spring 68. Similarly the second seal seat 64 has a second seat base 76 located at and rotatable with the shaft 72. A second seat flange 78 extends radially outwardly from the second seat base 76 defining an axial stop against which a second seal ring 66b is biased by the wave spring 68. Further, the first seal seat 62—includes an axially extending first pilot 80, which overlaps with the second seal seat 64, such that the first pilot 80 is radially located and supported by a radially outboard surface 82 of the second seat base 76. The first pilot 80 includes a guide ramp 84 so that second seal ring 66b is guided into a correct installed position during assembly of the seal assembly 60. In some embodiments, the guide ramp 84 is a tapering of the first pilot 80 with increasing distance from the first seat flange 74. The guide ramp 84 is tapered or chamfered at an angle between 1 degree and 89 degrees.

Figure 3A:
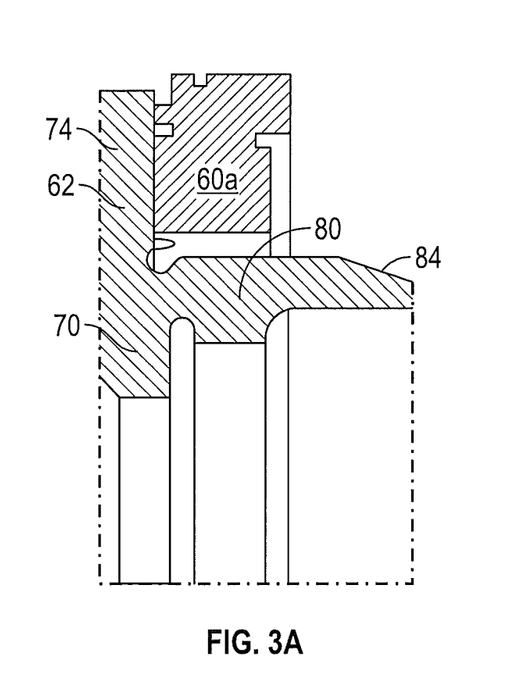
FIGS. 3A-3F illustrate an assembly sequence of an embodiment of a ring seal assembly of a gas turbine engine.
Figure 3B:
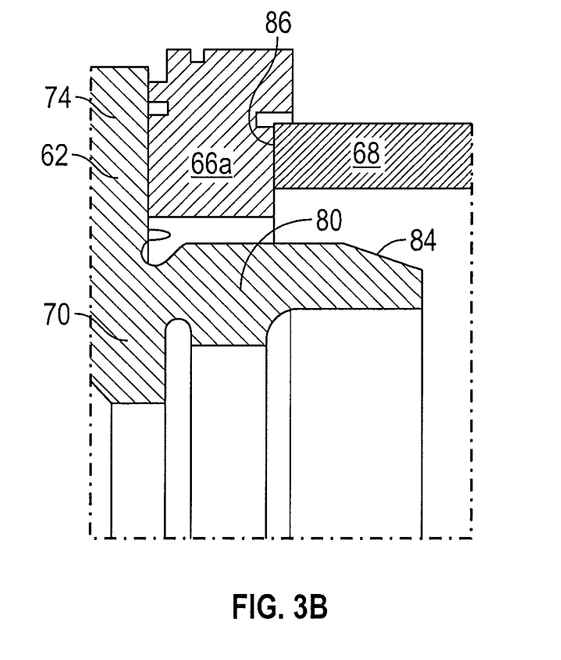
Figure 3C:
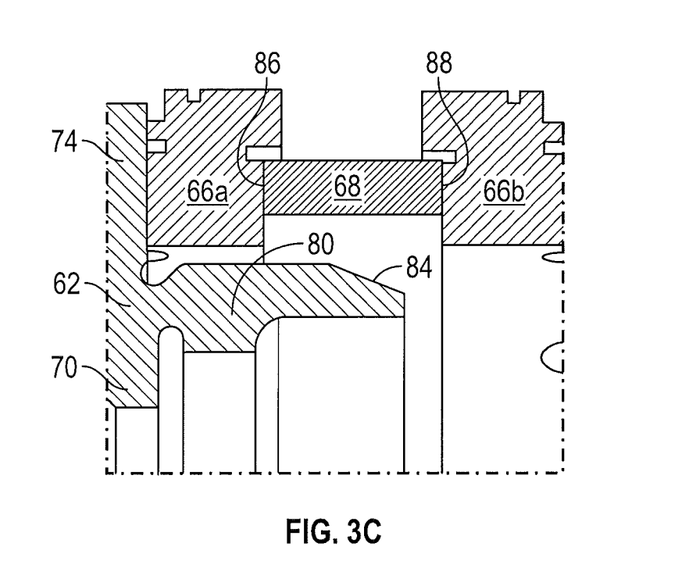
Figure 3D:
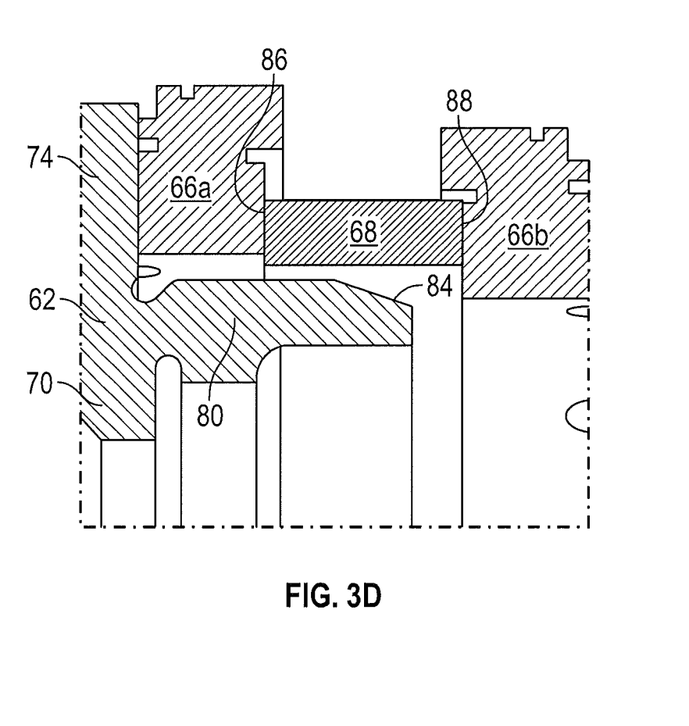
Figure 3E:
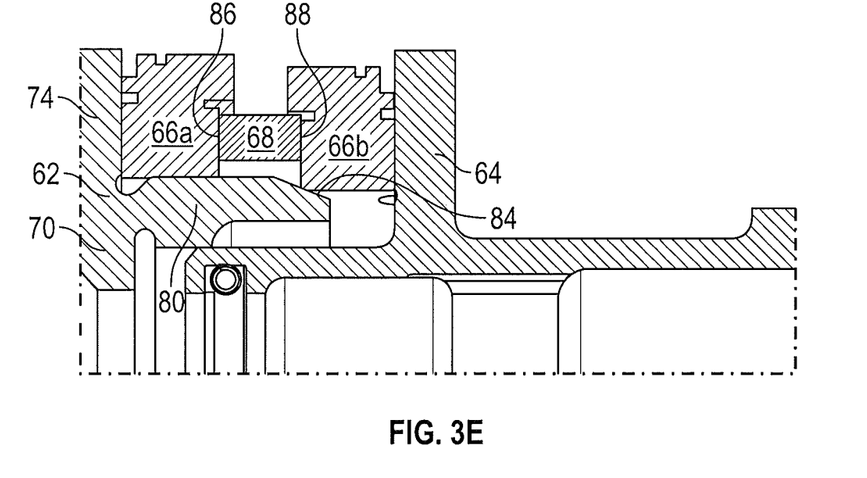
Figure 3F:
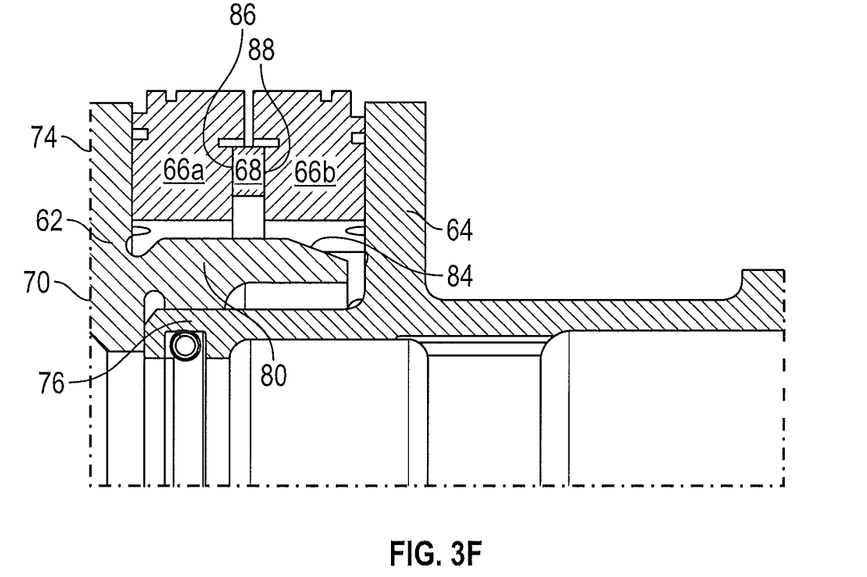

An assembly sequence of the seal assembly 60 is illustrated in FIGS. 3A-3F. In FIG. 3A, first seal ring 66a is installed to the first seal seat 62, located axially against the first seat flange 74, and radially outboard of the first pilot 80. Referring now to FIG. 3B, the wave spring 68 is installed against a first interface surface 86 of the first seal ring 66a. In FIG. 3B, the wave spring 68 is shown at its free axial length. The second seal ring 66b is installed in the illustration of FIG. 3C with a second interface surface 88 of the second seal ring 66b abutting the wave spring 68 such that the wave spring 68 is located between the first interface surface 86 and the second interface surface 88. As shown in FIG. 3D, due to gravity or other forces, the second seal ring 68b may move radially off-center. In FIG. 3E, the second seal seat 64 is installed by axially moving the second seal seat 64 toward the first seal seat 62. In doing so, the second seal ring 66b is urged toward the first seal ring 66a. Further, the second seal ring 66b engages the guide ramp 84, which guides the second seal ring 66b into a correct selected radial position during the movement of the second seal ring 66b toward the first seal ring 66a. Finally, referring to FIG. 3F, the second seal seat 64 is installed toward the first seal seat 62 to a fully installed position, such as when the second seat base 76 engages the first seat base 70 as shown. Utilization of the guide ramp 84 ensures proper seating and radial location of the second seal ring 66b thus preventing damage to the second seal ring 66b during assembly of the seal assembly 60.

Figure 4:
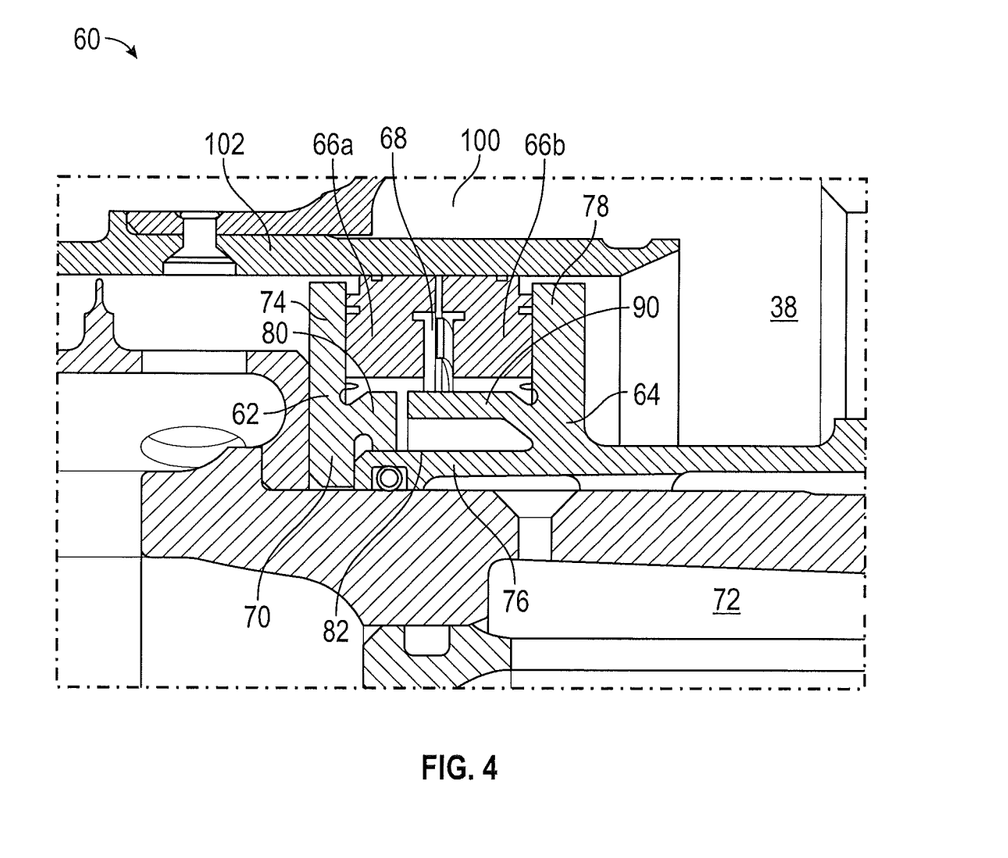
FIG. 4 illustrates another embodiment of a ring seal assembly of a gas turbine engine.

Another embodiment of a seal assembly 60 is shown in FIG. 4. In the embodiment of FIG. 4, the first seal seat 62 has a first pilot 80, and the second seal seat 64 includes a second pilot 90 extending from the second seat flange 78 as shown in FIG. 4, or alternatively from another portion of the second seal seat 64, such as the second seat base 76, for example. The first pilot 80 is utilized to guide and position the first seal ring 66a during the installation thereof, while the second pilot 90 is similarly utilized to guide and position the second seal ring 66b during installation of the second seal ring 66b. As such, when the seal assembly 60 is complete, the first pilot 80 extends at least partially below the first seal ring 66a, but does not extend below the second seal ring 66b.

Figure 5A:
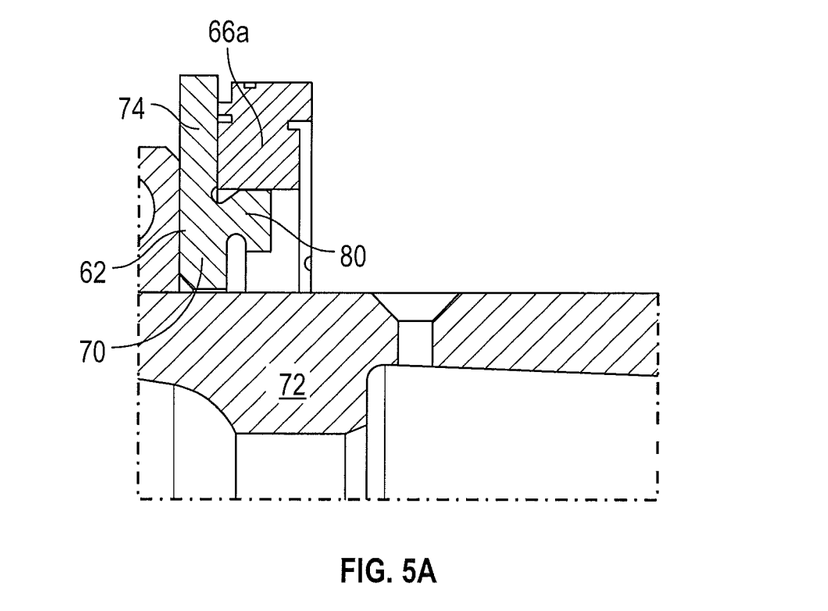
FIGS. 5A-5D illustrate an assembly sequence of a ring seal assembly of a gas turbine engine.
Figure 5B:
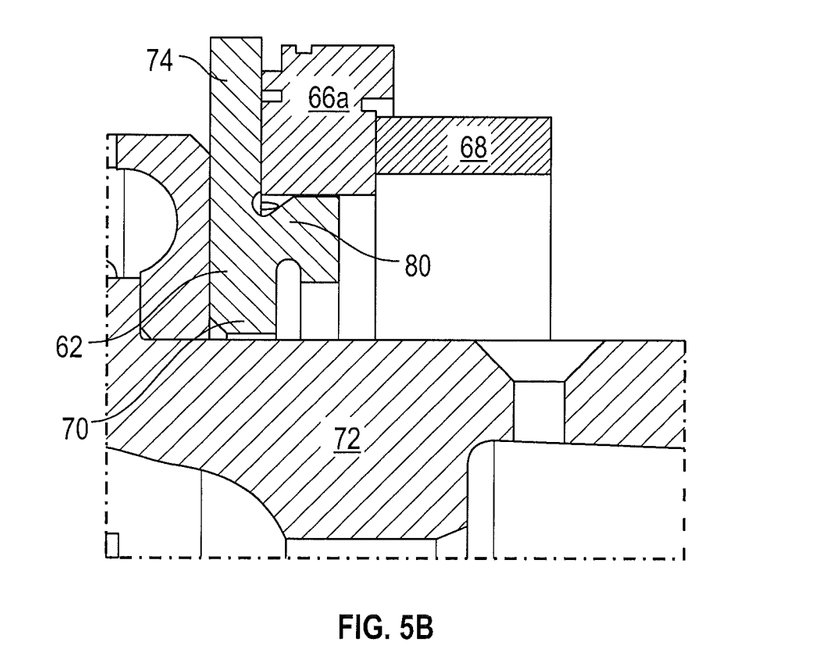
Figure 5C:
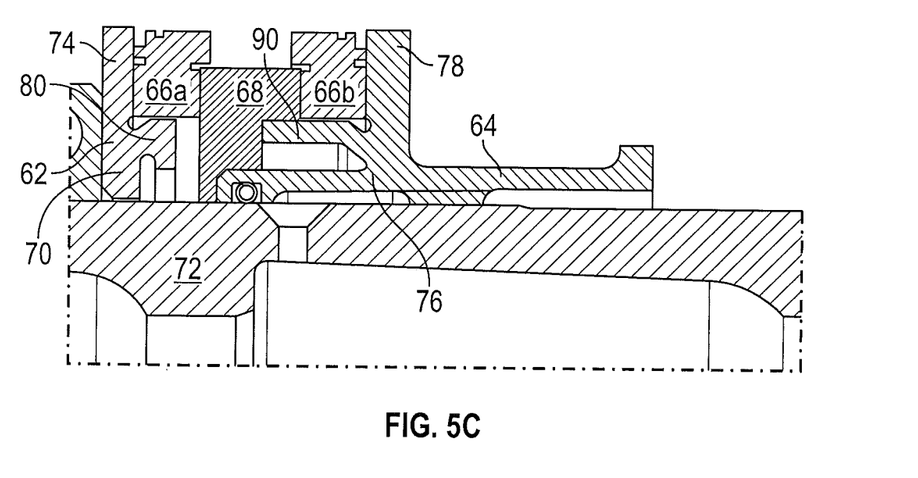
Figure 5D:
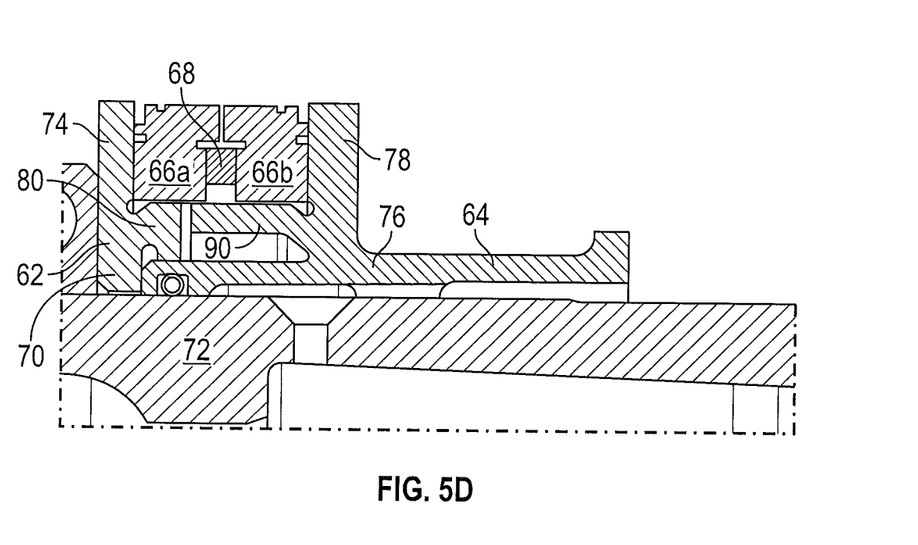

Referring now to FIGS. 5A-5D, an assembly sequence of the seal assembly 60 of FIG. 4 will be described. As shown in FIG. 5A, the first seal seat 62 is installed to the shaft 72, and the first seal ring 66a is installed onto the first seal seat 62, abutting the first seat flange 74 and radially outboard of the first pilot 80. Referring now to FIG. 5B, the wave spring 68 is then installed to abut the first interface surface 86 of the first seal ring 66a. Referring to FIG. 5C, the second seal seat 64 and the second seal ring 66b are then installed simultaneously, with the second seal ring 66b located radially outboard of the second pilot 90 and abutting the second seat flange 78. Finally, referring to FIG. 5D, the second seal seat 64 is installed toward the first seal seat 62 to a fully installed position, such as when the second seat base 76 engages the first seat base 70 as shown. Utilization of the first pilot 80 and the second pilot 90 ensure proper seating and radial location of the first seal ring 66a second seal ring 66b thus preventing damage to the seal rings 66a and 66b during assembly of the seal assembly 60.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ring seal assembly, comprising:
   a first seal seat;
   a second seal seat axially abutting the first seal seat;
   two or more seal rings disposed axially between the first seal seat and the second seal seat;
   one or more pilot features disposed at one or more of the first seal seat or the second seal seat to radially locate a ring seal of the two or more seal rings during assembly of the ring seal assembly; and
   a spring disposed between a first seal ring and a second seal ring of the two or more seal rings to axially locate the first seal ring and the second seal ring in the ring seal assembly;
   wherein the one or more pilot features includes a ramp portion to guide a seal ring of the two or more seal rings radially outwardly into a radial position outboard of the one or more pilot features.

2. The ring seal assembly of claim 1, wherein the first seal seat includes:
   a first pilot of the one or more pilot features extending from the first seal seat, the first seal ring of the two or more seal rings disposed radially outboard of the first pilot.

3. The ring seal assembly of claim 2, wherein the first pilot extends from a radially-extending first seat flange.

4. The ring seal assembly of claim 3, wherein the first pilot tapers in radial width with an increasing distance from the first seat flange.

5. The ring seal assembly of claim 2, wherein the first pilot is configured to guide the second seal ring to a radial position outboard of the first pilot upon installation of the second seal ring and the second seal seat.

6. The ring seal assembly of claim 2, wherein the second seal seat includes:
   a second pilot of the one or more pilot features extending from the second seal seat, the second seal ring of the two or more seal rings disposed radially outboard of the second pilot.

7. The ring seal assembly of claim 6, wherein the second pilot extends from a radially-extending second seat flange.

8. The ring seal assembly of claim 6, wherein the second pilot is configured to guide the second seal ring to a radial position outboard of the second pilot upon installation of the second seal ring and the second seal seat.

9. The ring seal assembly of claim 1, wherein the spring is configured to bias axial positions of the first seal ring and the second seal ring.

10. The ring seal assembly of claim 1, wherein the ring seal assembly is configured for installation to a rotating component of a gas turbine engine, the two or more seal rings configured to interface a rotationally static component of the gas turbine engine.

11. A method of installing a ring seal assembly, comprising:
provided a first seal seat;
a second seal seat axially abutting the first seal seat;
two or more seal rings disposed axially between the first seal seat and the second seal seat;
one or more pilot features disposed at one or more of the first seal seat or the second seal seat to radially locate a ring seal of the two or more seal rings during assembly of the ring seal assembly; and
a spring disposed between a first seal ring and a second seal ring of the two or more seal rings to axially locate the first seal ring and the second seal ring in the ring seal assembly; further comprising the steps of:
securing the first seal seat at a rotating component;
inserting the first seal ring onto the first seal seat;
installing the second seal ring and the second seal seat to the rotating component, the second seal ring guided into a selected radial position via the one or more pilot features, the first seal ring and the second seal ring configured to interface with a rotationally static component; and
positioning the spring axially between the first seal ring and the second seal ring to bias axial positions of the first seal ring and the second seal ring;
wherein the one or more pilot features includes a ramp portion to guide a seal ring of the two or more seal rings radially outwardly into radial position outboard of the one or more pilot features.

12. The method of claim 11, further comprising radially locating the first seal ring radially outboard of a first pilot of the one or more pilot features extending from the first seal seat.

13. The method of claim 12, further comprising guiding the second seal ring into the selected radial position via the first pilot.

14. The method of claim 13, wherein the first pilot is radially tapered with increasing axial length of the first pilot.

15. The method of claim 12, further comprising guiding the second seal ring into the selected radial position via a second pilot of the one or more pilot features extending from the second seal seat.

16. The method of claim 15, further comprising installing the second seal ring to the second seal seat, the second seal ring located radially outboard of the second pilot.

17. The method of claim 11, further comprising biasing an axial position of the first seal ring toward a radially extending first seat flange of the first seal seat, and biasing an axial position of the second seal ring toward a radially extending second seat flange of the second seal seat.

18. The method of claim 11, wherein the rotating component is a shaft of a gas turbine engine.

* * * * *